March 23, 1926.
J. R. GAMMETER
ROTARY CUTTER
Filed June 2, 1921
2 Sheets-Sheet 1
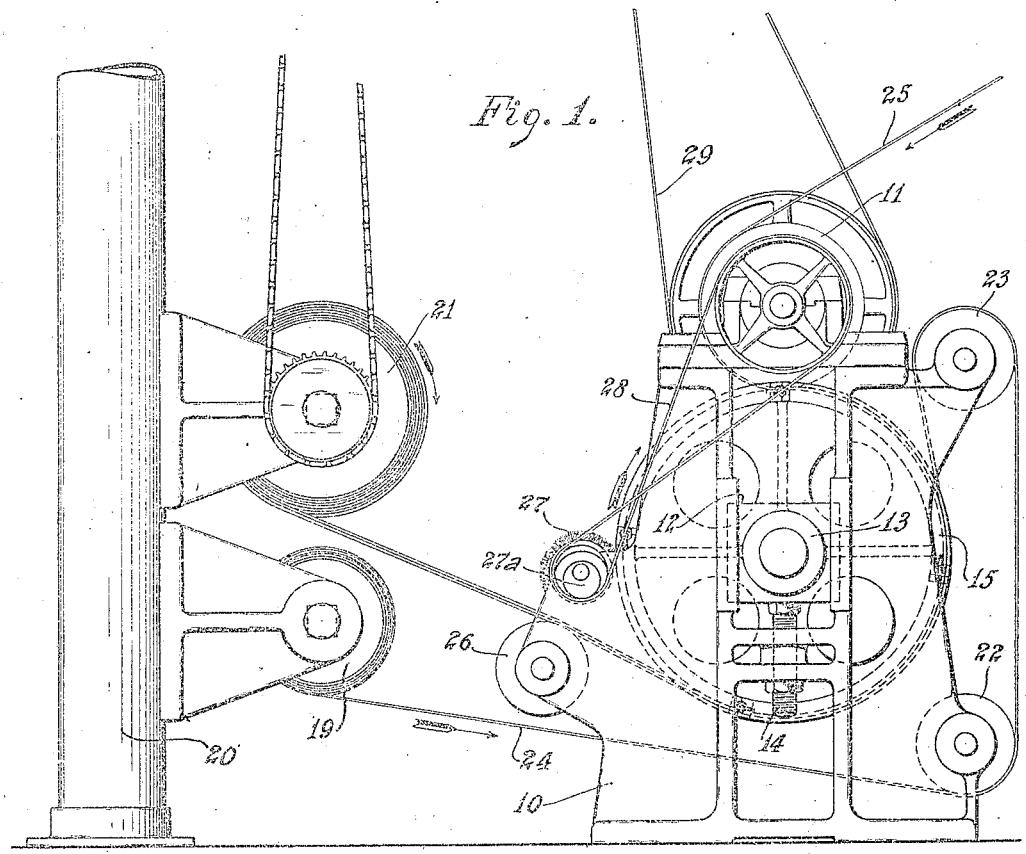
Fig. 1.
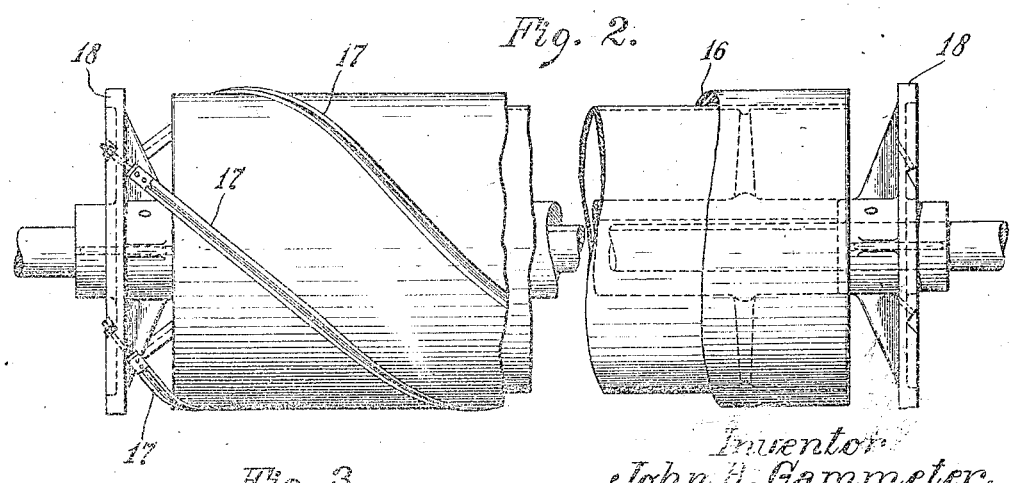
Fig. 2.
Fig. 3.
Inventor
John R. Gammeter.
By Robert M. Pierson
Atty.

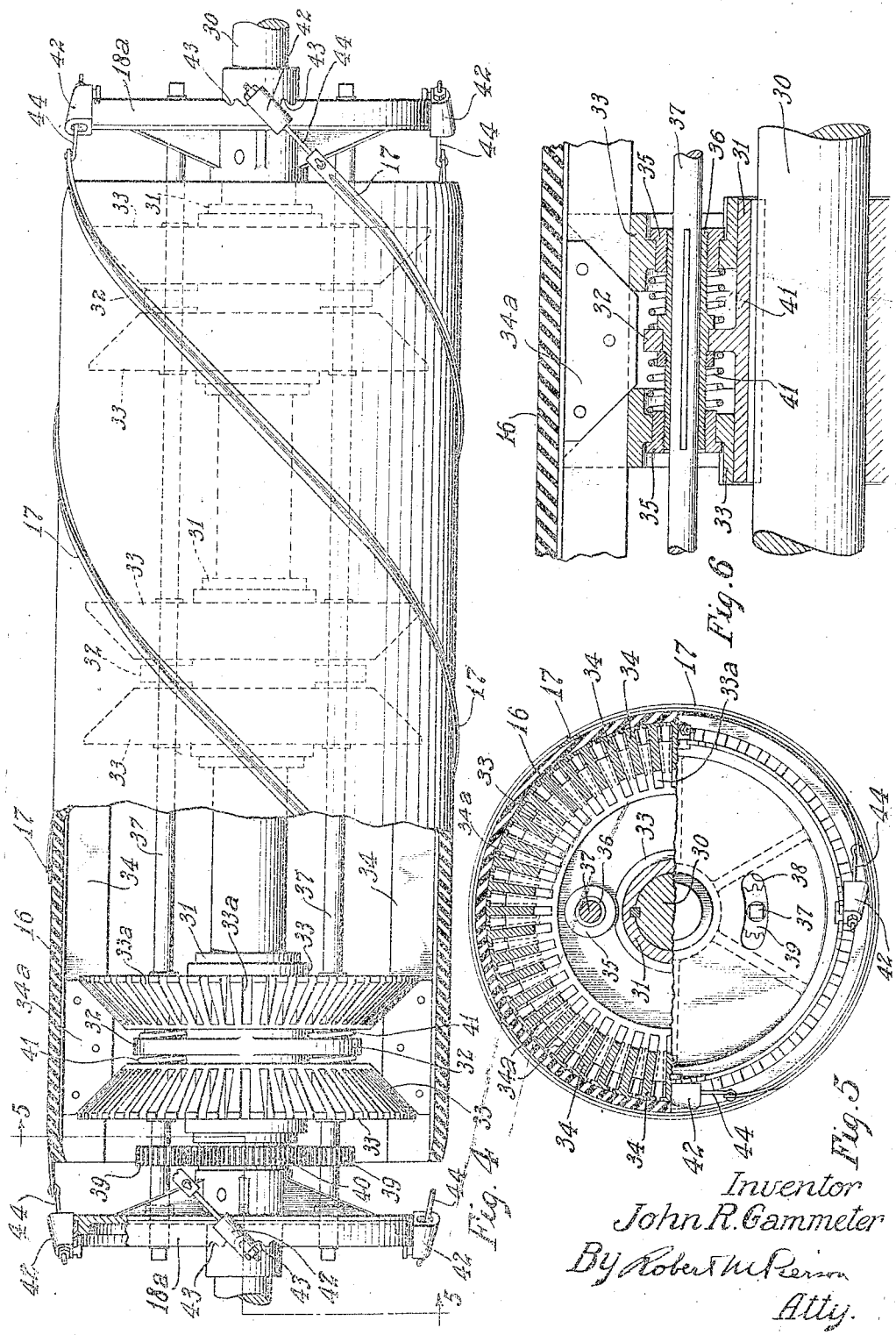

Patented Mar. 23, 1926.

1,577,619

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

ROTARY CUTTER.

Application filed June 2, 1921. Serial No. 474,320.

*To all whom it may concern:*

Be it known that I, JOHN R. GAMMETER, a citizen of the United States, residing at Akron, in the county of Summit and State of Ohio, have invented a certain new and useful Rotary Cutter, of which the following is a specification.

This invention relates to apparatus for cutting formed units from sheet material such, for example, as rubber or rubberized fabric.

The object of my invention is to provide rapid, accurate and durable cutting apparatus, means whereby the same may be quickly adjusted for cutting units of different size or shape, and means for receiving the stock from the cutter.

The particular embodiment shown in the accompanying drawings is adapted to cut a sheet of rubberized fabric, which may be either square-woven or thread or cord fabric, on a bias, to produce strips of stock such as are commonly used in the construction of pneumatic tires.

Of the accompanying drawings:

Fig. 1 is an elevation of a preferred embodiment of my invention.

Fig. 2 is a side elevation with parts broken away, of a simplified form of cutting drum.

Fig. 3 is a cross-section of a knife.

Fig. 4 is a side elevation, partly in section and with parts removed, of a preferred form of cutting drum.

Fig. 5 is a section on line 5—5 of Fig. 4.

Fig. 6 is a fragmentary, vertical, longitudinal section of the cutter drum shown in Figs. 4 and 5.

Referring to the drawings:

10, Fig. 1, is the nearer of a pair of end standards, in the top of which is journaled a hard roll 11 and each of which is formed with a vertical guide-way 12, in which is mounted a journal block 13 provided with an adjustment bolt 14 adapted to adjust said journal block vertically in said guideway. 15 is a cutter drum loosely journaled in said blocks and adapted to be held against the lower side of the hard roll 11 by said bolts 14. The cutter drum 15 is covered with a cushioning cover or sleeve of soft vulcanized rubber, 16, forming a resilient support for a series of flexible broad-based knives 17, 17, wound helically around said drum and anchored at each end to a circular bracket 18 secured against rotation relative to the drum 15 and preferably of somewhat smaller diameter, with respect to the anchorage points of the knives, than the diameter of the cutter drum, so that the knives will be held with substantially equal pressure against the cushion 16 throughout their length.

19 is a liner supply roll journaled upon standards 20 of which one is shown in Fig. 1, and 21 is a frictionally-driven liner-rewinding roll journaled on said standards above said liner supply roll. 22, 23 are liner guide-rolls journaled in the standards 10 in such positions as to cause a liner 24 from the roll 19 to pass part way around the cutter drum 15, in contact therewith, in passing to the liner rewinding roll 21. The latter is so positioned relative to the cutter drum 15 that the liner leaves the cutter drum near its bottom and passes substantially in a horizontal direction to the liner rewinding roll. The liner 24 is thus adapted to receive the bias-cut strips from the cutter drum 15, in substantially the same relative positions they occupied in the uncut stock strip, which latter is represented by the numeral 25, Fig. 1, and to carry them to the roll 21, to be there interwound with the liner upon said roll. 26 is a guide roll loosely journaled in the standards 10 and adapted to support the reach of liner which, with the cut stock thereon, passes from the cutter drum to the liner rewinding roll. 27 is a brush roll journaled in the standards 10 above said reach of liner and adapted to be driven from the hard roll 11 by a belt 28, in the same direction as the cutter drum 15, to insure the separation of the cut stock therefrom. Said brush roll is provided with eccentric journal blocks 27$^a$, one of which is shown in Fig. 1, adapted to adjust said roll from and toward the cutter drum 15 to compensate for wear of the brushes. The hard roll 11 is provided with a drive belt 29 and is adapted to draw the stock 25 from a supply roll, not shown, and carry it to the cutting point between said roll and the cutter drum, and frictionally to drive the latter.

In the preferred form of cutter drum shown in Figs. 4, 5 and 6, the drum is adapted to be expanded and the knives 17 thereon changed in position or number for cutting strips of different widths or number at each revolution of the drum, or strips of different angle of bias.

In this form the cutter drum comprises a spindle or shaft 30, upon which are secured modified circular brackets 18ª; a plurality of sleeves 31, 31 keyed on said shaft, each formed with a pair of diametrically opposite bearing ears 32, 32; a pair of frustro-conical chuck members 33, 33 slidably mounted upon each of said sleeves and with their smaller ends toward said ears, and formed with a series of radial slots 33ª, 33ª, extending inward from their peripheries; a set of T-beams, grid or grating members 34 mounted in the radial slots of said chuck members and constituting an expandible cylindrical grating; and mounted upon the latter, the cylindrical sleeve of rubber 16 forming the immediate support of the knives 17. Each of the chuck members 33 is formed with axially disposed apertures aligned with the bearing ears 32, in which apertures are secured against rotation, internally-threaded bushings, 35, 35, the aligned bushings of each pair of chuck members being oppositely threaded. 36 is a sleeve formed externally with right-and-left threads meshing with the threads of said bushings, said sleeve being journaled in the ear 32 and keyed upon a shaft 37 extending the length of the cutter drum, through the several aligned ears 32. Each of the shafts 37, of which there is one for each of the two aligned sets of ears, extends through an arcuate slot 38 in the circular bracket 18ª at each end of the drum and is squared at the end to receive a wrench or crank, and upon each shaft is secured a gear, 39, intermeshed with a gear 40 loose-journaled upon the spindle 30, whereby when one of said shafts is turned the other will be turned in the same direction, to move the conical chuck members 33 of each pair from and toward each other, through the action of the right-and-left threaded sleeves 37 and bushings 36, without cramping of said chuck members upon the sleeves 31. the force being applied to said members at diametrically opposite points. 41, 41 are compression springs between the ears 32 and the chuck members 33 of each pair, adapted to press the latter apart and so retain the same upon the bushings 35.

Each of the T-beams 34 is provided, between each pair of chuck members 33, with a pair of plates 34ª, 34ª secured to the side faces of said T-beam, and formed with slanting edge faces adapted to rest upon the sloping conical faces of the chuck members 33 at their respective sides of the slots 33ª in which the T-beam is mounted, the latter being thus adapted, by the movement of the chuck members in an axial direction, to be forced radially outward against the rubber sleeve 16 by the wedging action of the conical chuck members 33 as the latter are forced together, or to be driven radially inward by the reaction of said rubber sleeve as the chuck members are moved apart, to expand or contract the cutter drum.

The ends of the knives 17 are secured by anchor members 42, 42 adapted to be hooked selectively in notches 43, 43 formed in the periphery of the brackets 18ª to determine the angle of the knife upon the drum, and said knives are adapted to be tightened by adjusting bolts 44, 44 which pass through said anchor members and engage the ends of said knives.

The slots 38 in the brackets 18ª are given the arcuate form in order that the position of the brackets upon the spindle 30 may be changed to provide further adjustment of the angle of the knives.

The anchor members 42, as shown in Fig. 5, may be unequally spaced around the circumference of the drum, causing some of the knives to lie closer together than others, in order to cut stock strips of two or more widths at each revolution of the drum.

In the operation of the device the uncut sheet of stock is drawn from a supply roll, not shown, carried over the roll 11 and started between the latter and the cutter drum 15, and the liner is drawn from the roll 19, threaded through the device and started upon the rewinding roll 21, all as shown in Fig. 1.

Power is then applied through the belt 29, driving the roll 11 counter-clockwise as there viewed, drawing the stock 25 as indicated by the arrow and passing it between the roll 11 and the cutter drum 15, whereby the helically stretched knives 17, pressing the stock against the roll 11, cut it obliquely into strips. Said strips are carried downward between the drum 15 and the liner 24, rest upon the latter as it leaves the drum, and are thus wound with the liner onto the roll 21, the brush roll 27, turning clockwise as viewed in Fig. 1, insuring the separation of the stock strips from the drum.

For cutting strips at different angles or of different widths, the knives 17 may be adjusted upon the preferred form of drum shown in Figs. 4, 5 and 6, and the latter may be expanded or contracted, as indicated above, the rubber sleeve 16 and the knives 17 successfully bridging such gaps as occur between the T-beams or grating members 34. When the drum is expanded, the positions of the knives may be changed to preserve the angle of bias. The resilient rubber sleeve 16 insures substantially even pressure of the knives against the roll 11, but I do not wholly limit my invention to using a rubber cushioning member or placing it between the knives and the drum upon which they are mounted. The broad base of the knife 17 prevents it from unduly sinking into the rubber or from being over-turned by the cutting pressure. As the conical chuck members 33 are all of substantially the same form, size and adjustment, and are provided with common means for actuating them, the cutting drum maintains its cylindrical form when expanded or contracted, and this operation is reduced to the simple matter of turning one of the shafts 37.

It will be observed that in the embodiment shown, the cutting is progressive along the knife and that the roll 11 will engage the cutting edges of a succeeding knife or knives before leaving that of the last, whereby the roll 11 always has two or more bearing points upon the knives, tending to stabilize the pressure between the roll 11 and the knives and to facilitate their smooth operation. Each knife, however, is preferably of such length and pitch with relation to the drum as to constitute less than one complete turn about the latter, so that each cutting action will pass from the rear end of the knife before the leading end of the latter again engages the work, to avoid buckling of the knife such as might occur if more than one part of the knife at any given instant were in cutting engagement with the work.

Various modifications may be resorted to without departing from the scope of my invention and I do not wholly limit my claims to the specific construction shown.

I claim:

1. A cutter comprising an elongate knife, means for holding said knife under longitudinal tension, a resilient backing underlying said knife, and a platen member adapted progressively to meet the cutting edge of said knife in rolling contact.

2. A cutter comprising a series of knives, a resilient backing for said knives, and a member having an abutment face adapted progressively to meet the cutting edges of said knives in rolling face-to-edge contact, said member and said knives being so arranged that the former, before leaving one knife, engages the next.

3. A rotary cutter comprising a cylindrical roll, a flexible, obliquely disposed cutting member on said roll, and means for holding said cutting member under longitudinal tension on said roll, said cutting member having a broad base adapted to seat upon the cylindrical surface of said roll and a cutting edge upstanding therefrom.

4. A cutter comprising a cylindrical roll, a flexible cutting member wound helically about said roll and extending to the ends of the cylindrical surface thereof, means engaging the end portions of said cutting member for holding said cutting member under longitudinal tension on said roll, said cutting member having a broad base adapted to seat upon the cylindrical surface of said roll and a cutting edge upstanding therefrom, and a member having an abutment face adapted to press the work against said cutting edge.

5. A rotary cutter comprising a drum, a flexible, broad-based, longitudinally tensioned, cutting member wound helically upon the surface of said drum and tensioning means at the ends of the drum adapted to draw the end portions of said cutting member toward the axis of said drum while longitudinally tensioning said cutting member.

6. A rotary cutter comprising a drum, a layer of resilient material thereon, a cutting member adapted to seat upon said resilient material, said cutting member being helically mounted upon said drum, and means for holding said cutting member under longitudinal tension on said drum.

7. A rotary cutter comprising a pair of rolls, a flexible, flat-based cutting member stretched helically around one of said rolls, means for holding said cutting member under tension on said roll, the other of said pair of rolls having an abutment face adapted to press the work against the cutting edges of said member, and yielding means for impelling said cutting member and the opposite roll toward each other.

8. A rotary cutter comprising a pair of rolls adapted to cut a sheet of stock as it passes between the same and means for passing a liner partly around one of said rolls in contact therewith in a part of its orbit non-adjacent the cutting position, to receive the work therefrom.

9. A rotary cutter comprising a pair of rolls adapted to cut a sheet of stock as it passes between the same, means for guiding a liner partly around one of said rolls, in a part of its orbit non-adjacent the cutting position to receive the finished work, and a frictionally driven roll adapted to interwind thereon the finished work and the liner.

10. A cutter comprising an elongate, flexible knife, a resilient backing underlying said knife, and a platen member adapted progressively to meet the cutting edge of said knife in rolling contact.

11. A rotary cutter comprising a pair of rolls adapted to cut a sheet of stock into units as it passes between the same, means for driving a liner and guiding it in position to receive and carry away the cut units, and means for disengaging the units from one of the rolls at such part of the latter's orbit as to cause said units to lie in orderly relation on said liner.

12. A rotary cutter comprising an expandible drum, a flexible, obliquely disposed cutting member on said drum, and means for holding said cutting member under longitudinal tension to hold it against said drum.

13. A rotary cutter comprising an expandible, cylindrical drum, a flexible cutting member helically mounted upon the surface of said drum and extending to the ends of the cylindrical surface thereof, and means engaging the end portions of said cutting member for holding it under longitudinal tension upon said drum.

14. A rotary cutter comprising an expandible drum, a flexible cutting member mounted upon said drum, and means engaging the end portions of said cutting member for holding the latter under longitudinal tension in different selective positions upon the surface of said drum.

15. A rotary cutter comprising an expandible, cylindrical drum, a flexible cutting member helically wound upon said drum and having a broad base fitting the cylindrical surface of said drum and a cutting edge upstanding therefrom, and means for holding said cutting member under longitudinal tension.

16. A rotary cutter comprising a drum, a layer of resilient material thereon presenting a cylindrical surface, a flexible, elongated, broad-based cutting member mounted on said layer and substantially fitting the cylindrical surface thereof, and means for holding said cutting member under longitudinal tension in different positions on said drum.

17. A rotary cutter comprising a drum, a flexible cutting member stretched helically thereon and tensioning means for said cutting member adapted to pull the end portions thereof toward the axis of said drum.

18. A rotary cutter comprising an expandible drum provided with a layer of resilient material and a cutting member formed with a broad base adapted to seat upon said resilient material.

19. In apparatus for cutting sheet material, an expandible roll comprising an elastic cylindrical sleeve, a cutter mounted on said sleeve, means for pressing the work against said cutter, and means for expanding said sleeve while preserving its cylindrical form.

20. In apparatus for cutting sheet material, an expandible drum comprising a rubber sleeve, a cutter mounted on said sleeve, means for pressing the work against said cutter, a grating adapted to seat within said sleeve and means for expanding said grating.

21. In apparatus for cutting sheet material, an expandible drum comprising a spindle member, a set of grating members, wedging means between said spindle member and said grating members for forcing the latter in a radial direction, and a cutter mounted on said drum.

22. In apparatus for cutting sheet material, an expandible drum comprising a pair of wedging members formed with substantially conical wedging surfaces and a right-and-left threaded member adapted to move said members toward and from each other, and a cutter mounted on said drum.

23. In apparatus for cutting sheet material, an expandible drum comprising an elastic cover member, a set of grating members adapted to support said cover member, a plurality of expending members adapted to engage said grating members at different parts thereof to support the same and to force the same in a substantially radial direction, common means for actuating said expanding members, and a cutter mounted on said drum.

24. In a cutter for sheet material, the combination of a knife-holding drum, a flexible knife wound helically about said drum, means for holding the knife to the surface of the drum, a resilient backing member under said knife, and a cylindrical roll adapted to coact with said drum in a rotary cutting action upon the work, said drum being of such size in respect to the angle at which said knife lies thereon that said roll passes from the last end portion of said knife before it again contacts the foremost end portion of said knife.

25. In a cutter for sheet material, the combination of a knife-holding drum, a flexible knife wound helically about said drum, means for holding the knife to the surface of the drum, and a cylindrical roll adapted to coact with said drum in a rotary cutting action upon the work, said drum being of such size in respect to the angle at which said knife lies thereon that said roll passes from the last end portion of said knife before it again contacts the foremost end portion of said knife.

26. A rotary cutter comprising a cylindrical drum, a knife mounted obliquely on said drum and extending from end to end of the latter's cylindrical surface, means for holding the knife to the surface of the drum, a yielding backing member under said knife, a platen roll adapted to coact with said knife in face-to-edge relation, means for driving said roll, and means for so guiding the work as to cause it to be carried partly around said roll on the surface thereof in passing to the nip of said roll and drum.

27. A rotary cutter comprising a drum, a cutter mounted thereon, a platen roll adapted to act against said cutter, and means for so guiding the work as to cause it to be carried partly around said roll on the surface thereof in passing to the nip of said roll and drum.

In witness whereof I have hereunto set my hand this 20 day of May, 1921.

JOHN R. GAMMETER.